United States Patent Office 3,544,547
Patented Dec. 1, 1970

3,544,547
WATER-SOLUBLE TRIAZINE REACTIVE METAL COMPLEX MONOAZO DYESTUFFS
Allen Crabtree and Henry Roy Murton, Manchester, England, assignors to Imperial Chemical Industries Limited, Millbank, London, England, a corporation of Great Britain
No Drawing. Filed Aug. 14, 1967, Ser. No. 660,204
Claims priority, application Great Britain, Aug. 15, 1966, 36,390/66
Int. Cl. G09d 62/08; D06p 1/02
U.S. Cl. 260—146                              4 Claims

ABSTRACT OF THE DISCLOSURE

1:2 chromium and cobalt complexes of monoazo dyes of the general formula:

A—N=N—E—T in which A is an o-hydroxyphenyl or o-hydroxynaphthyl radical containing a nitro group and optionally 1 or more sulphonic acid groups, E is a hydroxyamino naphthyl sulphonic acid radical connected to the azo group in o-position to the OH group, T is a 2-chloro-4-anilino-s-triazin-6-yl radical connected to the amino group of E and having a sulphatoethyl-, chloroethyl- or vinyl-sulphonyl group on the benzene nucleus of the anilino group. The preferred dyestuffs are those based on nitroaminophenols and their monosulphonic acids as diazo components and 1,8 - aminonaphthol - 3,6 - disulphonic acids as coupling components, suitable mixtures of the Cr and Co complex giving neutral blacks of an exceptionally high rate of fixation.

---

This invention relates to new water-soluble reactive metal-complex azo dyestuffs, to the methods of preparation thereof and to the use of such dyestuffs for colouring textile materials.

It is known to use dyestuffs containing halogeno-s-triazine groups for the purpose of colouring fibres containing hydroxyl groups, especially cellulose materials such as cotton and viscose rayon.

These dyestuffs readily fix on such materials with good fastness to wet processing, since the halogeno-s-triazine group is able to react with hydroxyl groups of the cellulose molecule in the presence of acid-binding agents, especially at elevated temperatures. For this purpose, the dyestuffs are applied from aqueous solutions or aqueous printing pastes and, owing to a side reaction in which the halogeno-a-triazine group reacts with water instead of the cellulose molecule, a considerable portion of the dyestuff does not fix on the fibre.

Consequently an excess of dyestuff must be used and the dyeings or prints must be thoroughly washed with boiling soap solutions to remove the unreacted dyestuff. The wastage of dyestuff and extra processing make the dyeing or printing process more expensive, especially when deep shades are required.

The present invention is concerned with the production of water-soluble halogeno - s - triazine reactive metal-complex azo dyestuffs which have a remarkably high fixation on the fibre and for which washing-off treatments can be reduced considerably.

According to the invention there are provided water-soluble reactive metal-complex azo dyestuffs containing one atom of cobalt or chromium in complex union with two molecules of an azo compound of the formula:

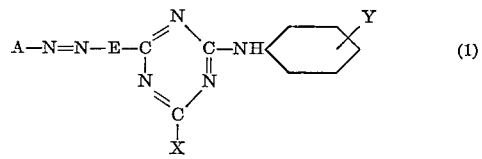  (1)

wherein

A stands for a nitro - o - hydroxyphenyl or nitro-o-hydroxy naphthyl radical in which the benzene or naphthalene nucleus may also be substituted with one or more sulphonic acid groups, E stands for the residue of an aminonaphthol sulphonic acid which is linked to the azo group in o-position to the hydroxyl group and linked to the triazine nucleus through the nitrogen atom of the amino group.

X stands for chlorine or bromine, and

Y stands for a chloroethylsulphonyl, vinylsulphonyl or β-sulphatoethyl sulphonyl group.

As examples of radicals represented by A there may be mentioned 5-nitro - 2 - hydroxyphenyl, 4-nitro-2-hydroxyphenyl, 5 - nitro - 2 - hydroxyphenyl-3-sulphonic acid, 3-nitro - 2 - hydroxyphenyl - 5-sulphonic acid and 6-nitro-1-hydroxynaphthyl-4-sulphonic acid.

As examples of radicals represented by E, there may be mentioned: 1 - hydroxy - 3,6 - disulpho-2,8-naphthyleneamino, 1 - hydroxy - 3 - sulpho-2,6-naphthyleneamino, 1-hydroxy - 3 - sulpho - 2,7-naphthyleneamino, 1-hydroxy-3:5 - disulpho - 2,6 - naphthyleneamino, and 1-hydroxy-5-sulpho-2,8-naphthyleneamino.

A preferred class of the new dyestuffs are the 1:2-cobalt and 1:2-chromium complexes of the compounds of the formula:

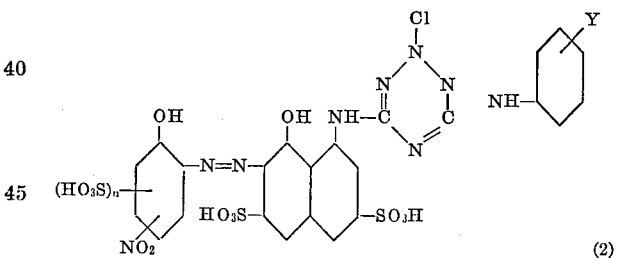  (2)

wherein Y has the meaning stated above and $n$ can be 0 or 1, which in admixture within the range of 1:1 and 1:4 provide neutral black shades with an exceptionally high rate of fixation on cellulose textile materials, the shades being very fast to light and to washing treatments. These mixtures form a further feature of the invention.

According to yet a further feature of the invention, there is provided a process for manufacture of the new water-soluble reactive metal-complex azo dyestuffs which comprises reacting together an amine of the formula:

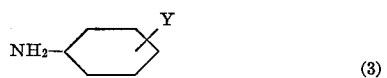  (3)

wherein Y has the meaning stated above, and a metal-complex azo compound containing one atom of cobalt or chromium in complex union with two molecules of an azo compound of the formula:

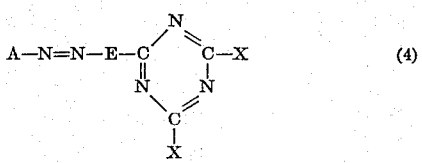

wherein A, E and X have the meanings stated above.

The above process can conveniently be carried out by stirring the reactants together in aqueous solution at a temperature of from about 15 to about 40° C. The reaction is preferably assisted by adding an acid-binding agent to absorb the liberated hydrogen halide, this acid-binding agent being added at such a rate as to maintain the pH of the reaction mixture between the limits of 6 and 7. The product so obtained can be isolated by the usual measures, e.g. by spray-drying the reaction mixture or by adding salt to precipitate the dyestuff which is then separated by filtration, and can be washed and dried.

As examples of amines of Formula 3 there may be mentioned m and p-sulphato-β-hydroxyethylsulphonylanilines, m- and p-β-chlorethylsulphonylanilines and m- and p-vinylsulphonylanilines.

The metal complex compounds used in the above process can be obtained by reacting together a metal complex aminoazo compound containing one atom of cobalt or chromium in complex union with two molecules of an aminoazo compound of the formula:

$$A—N=N—E_1 \qquad (5)$$

wherein A has the meaning stated above and $E_1$ stands for the residue of an aminophthol-sulphonic acid linked to the azo group in o-position to the hydroxy group, with two molecular proportions of cyanuric chloride or cyanuric bromide. If desired, a mixture of different metal complex compounds can be used in the process of the invention and/or the process of the invention can be carried out without isolating the said metal complex compound from the mixture in which it has been formed.

The said metal complex aminoazo compounds can be obtained by methods in themselves well-known, e.g. by diazotising an amine of the formula A—NH₂, coupling with an aminonaphthol sulphonic acid (under alkaline conditions) and treating the resulting aminoazo compound with from 0.5 to 0.7 molecular proportion of a chromium or cobalt salt. As examples of amines of formula A—NH₂ which can be used there may be mentioned 4-nitro-2-aminophenol, 5-nitro-2-aminophenol, 4-nitro-2-aminophenol - 6-sulphonic acid, 6-nitro-2-aminophenol-4-sulphonic acid and 6-nitro-1-amino-2-naphthol-4-sulphonic acid.

As examples of aminonaphthol sulphonic acids which can be used, there may be mentioned, 1,8-aminonaphthol-3,6-disulphonic acid, 6-amino-1-naphthol-3-sulphonic acid, 6-amino - 1-naphthol-3:5-disulphonic acid, 7-amino-1-naphthol - 3-sulphonic acid, 8-amino-1-naphthol-5-sulphonic acid.

According to a further feature of the invention there is provided a modification of the above process which comprises reacting a metal-complex aminoazo compound containing one atom of cobalt or chromium in complex union with two molecules of an aminoazo compound of Formula 5, wherein A and $E_1$ have the meanings stated above, with two molecular proportions of a heterocyclic compound of the formula:

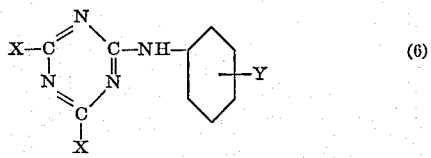 (6)

wherein X and Y have the meanings stated above.

This modified process can be carried out under reaction conditions similar to those described above for the first-mentioned process for manufacture of the new water-soluble reactive metal-complex azo dyestuffs.

The heterocyclic compounds of Formula 6 can be obtained by reacting together, in aqueous medium, an amine of Formula 3 above and cyanuric chloride or cyanuric bromide, preferably at a temperature of from 0 to about 5° C., and maintaining the reaction mixture at a pH within the range of 6 to 7 by addition of acid binding agent at a rate necessary to neutralise the hydrogen halide liberated during the course of the reaction.

According to yet a further feature of the invention, there is provided a process for manufacture of the new water-soluble reactive metal-complex azo dyestuffs which comprises interacting in an aqueous medium at a pH from 4 to 7 an azo compound of Formula 1 in which A, E, X and Y have the meanings stated above, with a salt of chromium or cobalt.

As examples of salts of chromium or cobalt which can be used, there may be mentioned chromium or cobalt salts of aliphatic carboxylic acids, for example of formic or acetic acid, and chromium or cobalt halides for example, the chlorides or fluorides together with buffers giving the required pH range, for example, alkali metal salts of aliphatic carboxylic acids or of aliphatic hydroxy carboxylic acids. If desired, a mixture of salts can be used.

The compounds of Formula 1 can be obtained by diazotising an amine of the formula A—NH₂, examples of which have been stated above, and coupling the diazonium compound so obtained with a coupling component of the formula:

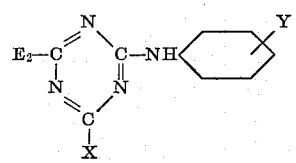

wherein $E_2$ stands for the residue of an aminonaphthol sulphonic acid linked to the triazine nucleus through the nitrogen atom of the amino group and X and Y have the meanings stated above. Such coupling components can be obtained, for example, by condensing cyanuric chloride or cyanuric bromide with, in either order, one molecular proportion of an aminonaphthol sulphonic acid, examples of which have been stated above, and one molecular proportion of an amine of Formula 3 above.

The above process can conveniently be carried out by heating the aqueous reaction mixture of chromium or cobalt salt and azo compound of Formula 1 at atmospheric pressure. If desired a neutral or acid organic liquid, for example, ethanol, n-butanol, β-ethoxyethanol, ethylene glycol or acetic acid, can be added to assist solubility but in general this is not necessary.

The new water-soluble reactive metal-complex azo dyestuffs are valuable for colouring cellulose textile material, for example, textile materials comprising natural or regenerated cotton. For colouring such textile materials, the new dyestuffs are preferably applied, either by a dyeing or printing process, to the cellulose textile material in conjunction with a treatment with an acid-binding agent, for example sodium hydroxide, sodium carbonate or sodium bicarbonate which may be applied to the cellulose textile material before, during or after the application of the dyestuffs. Alternatively when the colouration process involves the use of a heating step a substance can be used, for example, sodium trichloroacetate which is charged into an acid-binding agent during the heating step. When so applied to cellulose textile materials the new dyestuffs react with the cellulose and can be built up to give strong shades having very good fastness to light and to wet treatments especially to severe washing.

The invention is illustrated but not limited by the following examples in which parts and percentages are by weight:

EXAMPLE 1

To a solution of 15.85 parts of the 1:2-chromium complex of 8-(2′,4′-dichloro-s-triazin-6′-ylamino)-2-(5″-nitro-2″-hydroxyphenylazo) - 1 - naphthol-3:6-disulphonic acid obtained as disclosed in Example 1 of U. K. specification No. 985,481 in 300 parts of water at 0–5° C. is added a solution of 6.8 parts of 1-aminobenzene-3-β-hydroxyethylsulphone-sulphonic acid ester in 100 parts of water. The temperature of the mixture is raised to 35° C., keeping the pH at 6–7 by simultaneous addition of 10% sodium carbonate solution as required, and the mixture is stirred at 35° C. until the condensation is complete. The greenish-black dyestuff is precipitated by addition of sodium chloride, filtered off, dried and ground.

If, in place of the 15.85 parts of the 1:2-chromium complex, there are used 15.9 parts of the corresponding 1:2-cobalt complex, a reddish-black dyestuff is obtained which is precipitated by addition of sodium chloride, filtered off, dried and ground.

When a mixture of 66 parts of the 1:2-chromium complex and 34 parts of the 1:2-cobalt complex prepared above, is applied to cotton in the presence of an alkaline acid binding agent, neutral black shades are obtained with good fastness to light and washing; the percentage fixation of dyestuff is very high.

EXAMPLE 2

A solution of 9.2 parts of cyanuric chloride in 50 parts of acetone is added with stirring to 200 parts of crushed ice. To the suspension is added a solution of 11.6 parts of 7-amino-1-naphthol-3-sulphonic acid in 150 parts of water at pH 7.0. The mixture is stirred at 0–5° C. for 1 hour and the pH of the solution is then raised to 5.5 by addition of 10% sodium carbonate solution. A solution of 13.6 parts of 1-aminobenzene-4-β-hydroxyethylsulphone-sulphuric ester in 200 parts of water is added and the temperature is raised to 35° C., keeping the pH at 5–6 by simultaneous addition of 10% sodium carbonate solution as required, and the mixture is stirred at 35° C. until condensation is complete.

A suspension of 11.7 parts of 6-nitro-2-aminophenol-4-sulphonic acid in 150 parts of water and 10 parts of 10 N hydrochloric acid solution is stirred at 0–5° C. and diazotised with 25 parts of a 2 N solution of sodium nitrite. The diazo-oxide is added to the solution prepared above, keeping the pH at 6–7 by simultaneous addition of 10% sodium carbonate solution as required, and the mixture is stirred at 10° C. until coupling is complete. The dyestuff is precipitated by addition of potassium chloride and filtered off. The precipitate is then stirred in 500 parts of water, and 7.0 parts of cobaltous acetate tetrahydrate at 65° C. for 1 hour when metallisation is complete. After cooling the dyestuff is isolated by addition of potassium chloride, filtered off, dried and ground.

When a mixture of 75 parts of the 1:2-chromium complex, prepared similarly to the above, and 25 parts of the 1:2-cobalt complex prepared above is applied to cotton in the presence of an alkaline acid binding agent, neutral black shades are obtained with good fastness to light and washing; the percentage fixation is very high.

EXAMPLE 3

A solution of 4.7 parts of cyanuric chloride in 30 parts of acetone is added with stirring to 100 parts of crushed ice. To the suspension is added a solution of 6.8 parts of 1 - aminobenzene-4-β-hydroxyethylsulphon-sulphuric acid ester in 100 parts of water and the mixture is stirred at 0–5° C. keeping the pH at 6–7 by simultaneous addition of 10% sodium carbonate solution. When the condensation is complete the solution is added to a solution of 12.45 parts of the 1:2-chromium complex of 8-(5′-nitro-2′-hydroxyphenylazo)-1-naphthol-3:6-disulphonic acid in 300 parts of water and the mixture is stirred at 35° C. until condensation is complete, keeping pH at 6–7 by simultaneous addition of 10% sodium carbonate solution as required. The reddish-black dyestuff is precipitated by addition of sodium chloride, filtered off, dried and ground.

If in place of the 12.45 parts of the 1:2-chromium complex there are used 12.55 parts of the corresponding 1:2-cobalt complex a reddish-black product is obtained which is precipitated by addition of sodium chloride, filtered off, dried and ground.

When a mixture of 66 parts of the 1:2-chromium complex and 34 parts of the 1:2-cobalt complex prepared above is applied to cotton in the presence of an alkaline acid binding agent, neutral black shades are obtained with good fastness to light and washing; the percentage fixation of dyestuff is very high.

The following table gives further examples of the invention which may be prepared by similar methods to those described in Examples 1–3. The dyestuffs are characterised by the diazo component in Column II, the coupling component in Column III, the metal in Column IV the amine of Formula 3 in Column V and the shade in Column VI.

| I Example | II Diazo component | III Coupling component | IV Metal | V 2nd leg | VI Shade |
|---|---|---|---|---|---|
| 4 | 4-nitro-2-aminophenol | 1-amino-8-naphthol-3:6-disulphonic acid | Cr | 4-vinylsulphonyl aniline | Greenish-black. |
|  | ....do.... | ....do.... | Co | ....do.... | Reddish-black. |
| 5 | 4-nitro-2-aminophenol | 1-amino-8-naphthol-3:6-disulphonic acid | Cr | 4-β-chlorethylsulphonyl aniline | Greenish-black. |
|  | ....do.... | ....do.... | Co | ....do.... | Reddish-black. |
| 6 | 4-nitro-2-aminophenol-6-sulphonic acid | 1-amino-8-naphthol-3:6-disulphonic acid | Cr | 4-β-chlorethylsulphonyl aniline | Dull green. |
|  | ....do.... | ....do.... | Co | ....do.... | Dull violet. |
| 7 | 4-nitro-2-aminophenol-6-sulphonic acid | 1-amino-8-naphthol-4-sulphonic acid | Cr | 3-β-sulphatoethyl sulphonyl aniline | Dull blue. |
|  | ....do.... | ....do.... | Co | ....do.... | Dull maroon. |
| 8 | 6-nitro-1-amino-2-naphthol-4-sulphonic acid | 6-amino-1-naphthol-3-sulphonic acid | Cr | 3-β-sulphatoethyl sulphonyl aniline | Greenish-black. |
|  | ....do.... | ....do.... | Co | ....do.... | Reddish-black. |
| 9 | 6-nitro-1-amino-2-naphthol-4-sulphonic acid | 6-amino-1-naphthol-3:5-disulphonic acid | Cr | 3-β-sulphatoethylsulphonyl aniline | Greenish-black. |
|  | ....do.... | ....do.... | Co | ....do.... | Reddish-black. |

We claim:
1. Water-soluble reactive metal-complex azo dyestuffs selected from the group consisting of 1:2-cobalt and 1:2-chromium complexes of an azo compound of the formula:

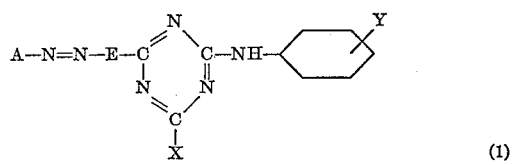

(1)

wherein A stands for a nitro-o-hydroxyphenyl or nitro-o-hydroxy naphthyl radical in which the benzene or naphthalene nucleus may also be substituted with one sulpohnic acid group, E stands for the residue of an aminonaphthol di-sulphonic acid which is linked to the azo group in opposition to the hydroxyl group and linked to the triazine nucleus through the nitrogen atom of the amino group, X stands for chlorine or bromine, and Y stands for a chloroethylsulphonyl, vinyl sulphonyl or β-sulphatoethyl sulphonyl group.

2. Water-soluble reactive metal complex azo dyestuffs as claimed in claim 1 wherein said azo compound has the formula:

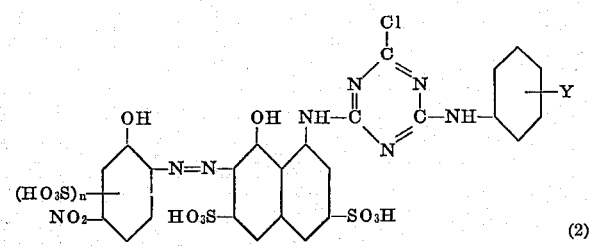

(2)

wherein Y has the meaning stated in claim 1 and n is 0 or 1.

3. A water-soluble reactive metal complex azo dyestuff in claim 1 being a 1:2 chromium complex of a monoazo compound of the formula:

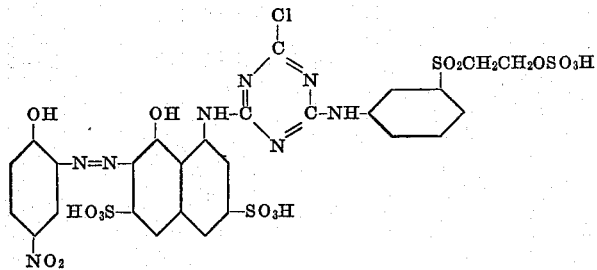

4. A water-soluble reactive metal complex azo dyestuff in claim 1 being a 1:2 cobalt complex of a monoazo compound of the formula:

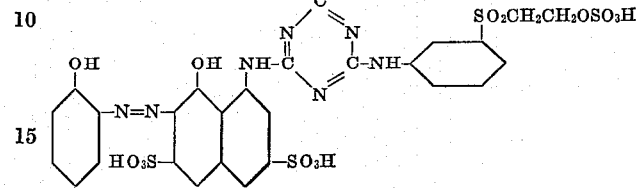

References Cited

UNITED STATES PATENTS 3,417,074  12/1968  Kühne et al. _____ 260—153X

CHARLES B. PARKER, Primary Examiner

D. M. PAPUGA, Assistant Examiner

U.S. Cl. X.R.

8—26, 42, 54.2; 260—145, 153, 249.8